United States Patent [19]

Moeremans

[11] Patent Number: 4,504,165
[45] Date of Patent: Mar. 12, 1985

[54] BALL-AND-SOCKET JOINT, ESPECIALLY FOR MOUNTING THE CASING OF AN ORIENTABLE REAR-VIEW MIRROR

[75] Inventor: Guy Moeremans, Rueil, France

[73] Assignee: Regie Nationale des Usines Renault, Billancourt, France

[21] Appl. No.: 336,276

[22] Filed: Dec. 31, 1981

[30] Foreign Application Priority Data

Mar. 11, 1981 [FR] France ................................ 81 04854
Oct. 6, 1981 [FR] France ................................ 81 18778

[51] Int. Cl.³ .......................................... F16C 11/00
[52] U.S. Cl. .................................. 403/129; 403/141; 248/481; 248/483
[58] Field of Search ................... 350/288, 289, 307; 248/481, 483, 289.3; 403/90, 122, 129, 135, 141

[56] References Cited

U.S. PATENT DOCUMENTS

| 1,574,899 | 3/1926 | Kellogg | 403/76 X |
| 2,433,594 | 12/1947 | Calo | 403/90 X |
| 2,648,091 | 8/1953 | Jones | 403/142 X |
| 2,675,532 | 4/1954 | Quick | 403/290 X |
| 2,984,249 | 5/1961 | Sears et al. | 403/90 X |

FOREIGN PATENT DOCUMENTS

| 815767 | 6/1969 | Canada | 403/295 |
| 742193 | 2/1961 | Fed. Rep. of Germany | 248/481 |
| 1282359 | 11/1968 | Fed. Rep. of Germany | 403/297 |
| 728329 | 12/1966 | Italy | 403/90 |
| 1351449 | 5/1974 | United Kingdom | 403/90 |

Primary Examiner—Richard J. Scanlan, Jr.
Attorney, Agent, or Firm—Burgess, Ryan and Wayne

[57] ABSTRACT

The invention provides a ball-and-socket joint comprising two joint components one of which is constituted by a ball having a convex spherical surface integrally connected to a supporting rod, while the other joint component is constituted by a socket having a concave spherical surface partially surrounding said ball and frictionally connected thereto, wherein at least one of said components comprises a plurality of elements each of which defines a spherical surface section complementary to the spherical surface of the other joint component, said elements being pressed in substantially radial directions with their respective spherical surface sections, by biasing means, against the spherical surface of the other joint component.

1 Claim, 5 Drawing Figures

BALL-AND-SOCKET JOINT, ESPECIALLY FOR MOUNTING THE CASING OF AN ORIENTABLE REAR-VIEW MIRROR

The present invention is related to a ball-and-socket joint, especially for mounting the casing of an orientable rear-view mirror or the like, which comprises a spherical ball integrally connected to a supporting rod and connected movably to at least one mounting block supporting a socket which defines an at least substantially spherical recess frictionally holding said ball therein and mounted within said casing.

Known ball-and-socket joints of this kind and the rear-view mirrors associated thereto present several drawbacks, especially when they are mounted in a vehicle where they are subjected to vibration due to the operation of the motor of the vehicle, or due to shaking or shocks resulting from the displacement of the vehicle. Under the action of such vibration, shaking and/or shocks, the rear-view mirror, which must be conveniently oriented in a precise manner so as to offer a satisfactory backward view to the driver of the vehicle, may not be maintained in the desired correct position due to insufficient clamping force between the ball and the socket. In many cases, even when the above requirements are met satisfactorily by a new rear-view mirror, it is observed that due to wear and/or aging of the material of the ball and the socket the clamping force decreased progressively, whereby the driver is obliged to correct more and more frequently the position of the rear-view mirror while diverting, during this operation, his eyes from the trajectory of the vehicle (e.g. from the road in front of a motor car). This not only constitutes a nuisance for the driver, but may also bring about serious risks as to the safety of the vehicle, its passengers and/or freight.

The present invention is aimed at overcoming the drawbacks of the known ball-and-socket joints of the kind considered herein by providing a ball-and-socket structure wherein the frictional forces acting between the ball and the socket are always sufficient for safely holding these two elements in the desired relative position, even under the effect of vibration, shock or wear.

With this object in view, the invention provides a ball-and-socket joint comprising two joint components one of which is constituted by a ball having a convex spherical surface and integrally connected to a supporting rod, while the other joint component is constituted by a socket having a concave spherical surface partially surrounding said ball and frictionally connected thereto, wherein at least one of said components comprises a plurality of elements each of which defines a spherical surface section complementary to the spherical surface of the other joint component, said elements being pressed in substantially radial directions with their respective spherical surface sections, by biasing means, against the spherical surface of the other joint component.

In one embodiment of the invention, the ball is constituted by at least two ball portions connected each to said supporting rod and separated by radial intervals so dimensioned that, when said ball portions are pressed towards each other, the ball can be introduced into said socket through a radial opening provided therein, said biasing means being constituted by elastic spreading means adapted to be introduced axially between said ball portions after the introduction of the ball into the socket, and to press said ball portions against the spherical surface of said socket.

In another embodiment of the invention said socket comprises a plurality of coaxial symmetrical socket portions constituted each by an elastic pad having a concave spherical surface section complementary to and in engagement with the convex spherical surface of the ball, said biasing means being constituted by a helical compression spring, coaxially surrounding said pads and urging said pads axially against said ball.

In one preferrgd embodiment, the spreading means are constituted by a helical spring.

In still another embodiment, said spreading means are constituted by a tubular spring having a longitudinal slit.

In yet another embodiment, the ball comprises at least three ball portions separated from each other by radial intervals.

In a particular embodiment, said ball and said supporting rod are integral with each other and made of moulded plastic material.

In one embodiment, the tubular spring is made of a material adapted to be glued or welded to the ball portions.

In yet another embodiment, the tubular spring is provided at its periphery with grooves or protuberances preventing it from being withdrawn accidentally from said ball.

According to still another advantageous embodiment, the helical compression spring is constituted by a helical wire having a cross-section which defines at least one planar face forming the inner surface of said spring.

According to still another embodiment, said socket comprises four pads made of elastic plastic material and forming a cross around the spherical surface of the ball.

Other objects and advantages of the invention will appear from the detailed description herein below of several embodiments of the invention, this description referring to the appended drawings and being given by way of illustration, but not of limitation.

Figure 1:
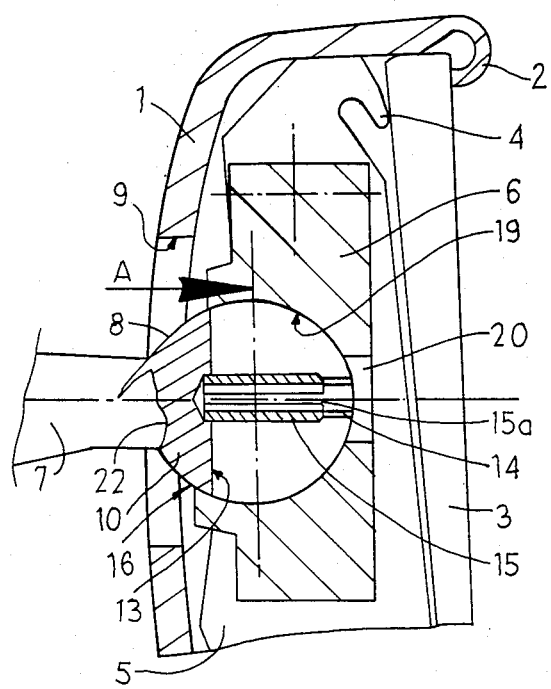
FIG. 1 is a schematic partial sectional view of the ball-and-socket joint according to the invention, associated to a rear-view mirror of an automobile.

The rear-view-mirror shown partially in FIG. 1 comprises an outer casing 1 made of moulded plastic material, the inwardly bent edge portions 2 of which retain a reflecting prism 3 bearing elastically on tongues 4 integral with one or two mounting blocks 5 on which is mounted a pivotally movable ball socket 6 made of plastic or metallic material.

A ball member is housed in said socket 6 and comprises a supporting rod 7 and a spherical portion 8 constituting the ball properly speaking; said ball is introduced into casing 1 through a clearance aperture 9. According to one aspect of the invention, ball 8 comprises a plain portion 10 connected to rod 7 and four spherical sections 11 (cf. FIG. 2) delimited by two grooves or intervals 12 arranged in the form of a St. Andrew's cross and extending up to a planar connecting surface 13 where said spherical sections 11 are integrally connected to plain ball portion 10.

Grooves 12 open at the centre of the ball into a bore 14 defined by the respective innermost ends of spherical sections 11, and an elastic member 15 constituted by a tube provided with a longitudinal slot 15a is introduced by force into said bore. Said elastic member or tube 15 exerts an important elastic force directed radially outwardly on each spherical section 11. Split tube 15 not only constitutes a tubular spring, but also forms an inner stop member for spherical portions 11 when the two longitudinal edges of slot 15a engage each other. Said longitudinal slot 15a can be rectilinear or helical, however in any case, its edges must be clearly separated from each other prior to the introduction of the tube into the bore, so that the tube exerts a spreading effect on spherical portions 11. The split tube is made preferably of spring steel, although the use of other materials having a convenient elastic limit and a satisfactory corrosion-resistance may also be envisaged. It is also possible to use a split tube made of the same plastic material as that constituting ball 8, whereby tube 15, after having been put in place, can be welded by simple means, such as friction or vibration welding, to the wall portions of spherical sections 11 which form bore 14. Furthermore, tube 15 may be provided at its periphery with retaining grooves or protuberances preventing said tube from being accidentally extracted from bore 14, e.g. under the effect of vibration or the like.

Figure 3:
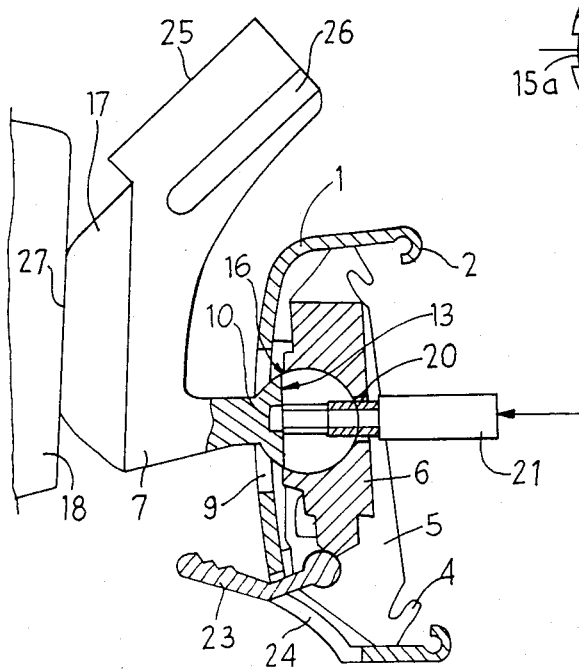
FIG. 3 is a sectional view illustrating the mounting of the ball in the rear-view-mirror prior to the mounting of the reflecting prism thereof.

FIG. 3 illustrates the mounting in ball socket 6 of spherical portion or ball 8. Socket 6 mounted on mounting blocks 5 enabling the reflecting prism to be adjusted to the desired "night" or "day" position is first placed into casing 1. The operator who carries out the mounting operation then introduces the spherical ball portion 8 through aperture 9 and pushes it toward an aperture 16 of the spherical recess 19 defined within socket 6, by applying a support portion 17 of supporting rod 7 onto a resting member 18. Since, at this stage, elastic spreading tube 15 has not yet been placed into bore 14, or has only been engaged into the end portion of bore 14, a pressure exerted by the operator on socket 6 in the direction of resting member 18 causes the spherical portions 11 to be pushed toward each other, i.e. toward the center of the ball, and to pass through aperture 16 so as to penetrate spherical recess 109 (cf. FIG. 1) defined within ball socket 6.

With a view to locking spherical sections 11 then within recess 19, one only has to push tube 15, e.g. by means of a rod 21, into bore 14 through an aperture 20 provided in socket 6 adjacent the location of prism 3 (which then has not yet been mounted), the diameter of rod 21 being smaller than that of said aperture 20. When using a rod 21 having a diameter smaller than that of bore 14, it is possible to push split tube 15 into a central position within ball 8, as shown in FIG. 1, or, preferably, into a position where said tube abuts, beyond the connecting surface 13, in an extension 22 of bore 14. As illustrated in FIG. 3, socket 6 can be brought selectively into two stable positions with reference to mounting blocks 5 and casing 1 and thus constitutes a "night-day" position selecting manipulator controlled by a lever 23 passing through an aperture 24 provided in casing 1, preferably at the lower end thereof.

According to one important aspect of the invention, ball supporting rod 7 is moulded integrally with ball or spherical portion 8, a mounting and clamping support having resting, clamping and wind-screen damping surfaces shown respectively at 25, 26 and 27, when desired.

Using a ball made of plastic material enables to provide a ball having a large diameter which ensures an improved guidance of the rear-view-mirror, as well as more stable and soft friction. Furthermore, the moulding porosity hazard is reduced due to the division of the active portion of the ball into several radial sections; according to the particular conditions, only three such sections may be provided, or more than four sections, e.g. in the case of large rear-view-mirrors four heavy-weight lorries, trucks or the like.

Split tube 15 constitutes a strong spring the substantially radial action of which renders the friction between the ball and the associated socket more constant and eliminates chattering in the various positions of the rear-view-mirror. Due to the use of a plastic material which may be coloured in the mass in accordance with the colour of the outside or inside of the vehicle, the variqus rear-view-mirrors inside and outside of the vehicle can be adapted to the general aspect of the vehicle body, thus constituting no aesthetical nuisance.

Furthermore it will be understood that the above described structure, when mass produced, has the advantage of a very low cost of the various plastic material components which have a very low weight and can be easily mounted by means of clip connections or the like, without any specific tooling, whereby the production can be diversified and disseminated in a particularly advantageous manner from an ecological point of view.

Figure 4:
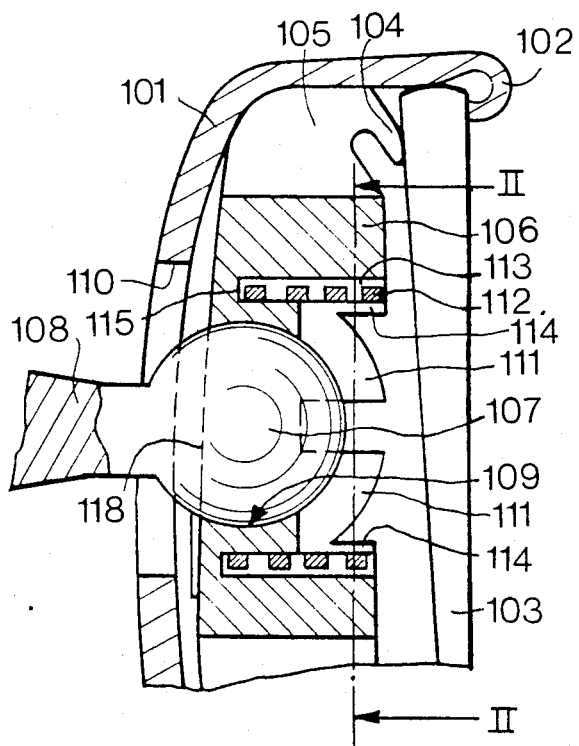
FIG. 4 is a partial sectional view of another embodiment of the invention.

In the embodiment shown in FIG. 4, the rear-view-mirror comprises also a casing 101, preferably made of a substantially rigid moulded plastic material the inwardly bent edge portions 102 of which retain a mirror, especially a reflecting prism 103, in such a way that said prism rests elastically on tongues 104 of a mounting block 105 having two blades carrying a ball socket 106 made of plastic material and movable with respect to casing 101.

A ball 107 of substantially spherical shape, integral with a supporting rod 108 which is conveniently mounted at a fixed location on a wall of a vehicle or the like, is engaged in a recess 9 formed by a spherical cavity defined by the ball socket 106, in a manner known per se. A clearance aperture 110 provided in the casing 101 at the side thereof which is located opposite to reflecting prism 103, allows the casing and the components contained therein to be oriented or adjusted to any desired position with respect to supporting rod 108 and ball 107, so that the driver of the vehicle is enabled to adjust the rear-view-mirror with a view to obtaining an optimum field of vision on reflecting prism 103.

Figure 5:
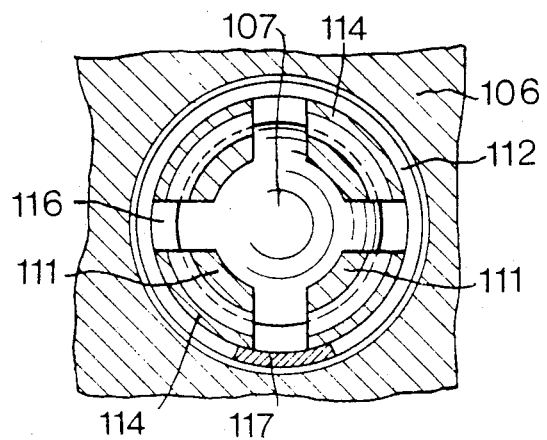
FIG. 5 is a sectional view taken along the line II—II in FIG. 4.

Socket 106 comprises four pads 111 shown partially in section in FIG. 5, which elastically engage the outer surface of ball 107. The inner surfaces of said pads, which are in contact with the ball, constitute socket portions defining segments of the spherical inner surface formed by recess 109 and delimiting the recess containing ball 107. Pads 111 are disposed substantially radially and symmetrically with respect to a geometrical axis of spherical recess 109, which axis passes through the common centre of said recess and ball 107, whichever the position of the casing may be.

Said pads preferably have identical shapes and dimensions, and they are spaced from each other by intervals 116 which may have a substantially rectangular configuration, as shown in FIG. 5, or a substantially conical configuration, i.e. tapering in the direction from the side of the ball socket which is located in front of reflecting prism 103.

As shown particularly in FIG. 4, a helical spring 112 made preferably from wire having a rectangular or square section (cf. section 117 FIG. 5) is engaged by force onto the bottom 115 of a groove 113 in socket 106 concentrically to the four pads 111, so as to press the latter against spherical ball 107 through the intermediary of extensions 114 in the shape of annular segments integral with pads 111. Spring 112, when mounted in groove 113, exerts a compression force on extensions 114, which tends to urge pads 111 against ball 107 in a direction opposed to reflecting prism 3, towards the centre of ball 107.

Thus the frictional contact between the outer surface of ball 107 and the concave spherical surface 109 of the associated socket is always maintained, even in the case of wear and/or aging of the material constituting pads 111 and/or ball 107. It should be noted that the elastic forces ensuring this contact between the convex spherical surface of the ball and the concave spherical surface of the socket defined, in a large degree, by the internal spherical surface segments of elastic pads 111, comprise not only substantially radial components determined by the action of said pads and the spring 112, but also an axial component determined by the action of helical spring 112 on the extensions 114, whereby an improved and more efficient maintain of casing 101 in the desired position with respect to the ball and thus with respect to the related wall of the vehicle, as well with respect to the eyes of the driver is obtained; consequently the driver always has the desired field of vision without having to correct manually at more or less short intervals of time, the position of the rear-view-mirror.

Figure 2:
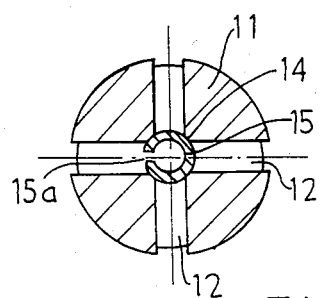
FIG. 2 is a cross-sectional view of the ball, taken along the line A indicated in FIG. 1.

In a particular embodiment (not shown in the drawings) the socket according to FIGS. 4 and 5 is combined with the ball according to FIGS. 1 to 3. It will be understood that in such embodiment the elastic forces applied by the ball comprising a plurality of ball portions in the direction of the socket are combined with the forces exerted by the socket according to FIGS. 4 and 5 in the direction of the ball, whereby the rear-view-mirror is maintained in the desired position in a still more efficient manner.

The invention is not limited to the embodiments shown and described herein above; many variants and modifications may be envisaged by those skilled in the art without departing from the spirit and scope of the invention as defined in the appended claims.

What is claimed is:
1. A ball-and-socket joint comprising:
a supporting rod;
a ball having a spherical outer surface, said ball comprising (i) a rear portion having a forward surface and (ii) a plurality of spherical sections abutting said forward surface of said rear portion and delimited by circumferentially extending grooves or slots therebetween,
said rear portion being integrally connected to an end of said supporting rod,
said ball having a central bore therein extending into said forward surface of said rear portion;
a socket having a spherical inner surface partially surrounding said ball,
said spherical internal surface being complementary to the spherical outer surface of said ball and frictionally engaging said spherical sections of said ball,
said socket having a relatively large rear central aperture and a relatively small front central aperture therein,
said rear aperture being disposed adjacent said supporting rod and dimensioned to receive said spherical sections of said ball when said sections are moved radially inward toward said bore,
said front aperture having an opening larger than said bore; and
a spring comprising a split tube having a longitudinal slot therein,
said tube being disposed in said bore and extending between said spherical sections of said ball and into said forward surface of said rear portion thereof,
the outer diameter of said tube being greater than the inner diameter of the portion of said bore extending into said forward surface of said rear portion of said ball when said slot is fully open,
said outer diameter of said spring being equal to said inner diameter of said portion of said bore when said slot is partially closed,
said tube being dimensioned to be insertable through said front aperture opening of said socket,
said spring resiliently urging said spherical sections of said ball against said internal surface of said socket, to permit rotation of said socket about said ball while maintaining said ball and socket in mutual frictional engagement,
said slot being dimensioned so that the edges thereof engage each other when said spherical sections are moved toward said bore, the engagement of said slot edges providing an inner stop to restrict further movement of said spherical sections toward said bore;
whereby said spring may be inserted into said socket through the front aperture thereof and said spherical sections of said ball may be inserted into said socket through the rear aperture thereof, with said spring preventing said spherical sections of said ball from being pressed together to an undesired extent when said spherical sections are inserted into said socket, and said spring may be installed in the portion of the bore extending into said forward surface of said rear portion of said ball.

* * * * *